Patented Mar. 9, 1948

2,437,645

UNITED STATES PATENT OFFICE 2,437,645

METAL COMPLEXES OF PYRAZOLONE AZO DYESTUFFS

Robert Sidney Long and Charles Edward Lewis, Somerville, N. J., assignors to American Cyanamid Company, New York, N. Y., a corporation of Maine No Drawing. Application December 8, 1944, Serial No. 567,305

15 Claims. (Cl. 260—147)

This invention relates to metal complexes of azo dyestuffs derived from 3-amino-5-pyrazolones as coupling components. The dyestuffs may be represented by the following formula:

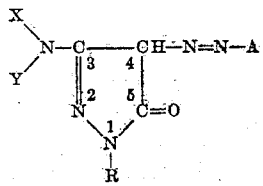

in which A is the residue of a diazotized aromatic primary amine having a lake-forming group ortho to the azo group, R is a radical selected from the group consisting of hydrogen and aryl radicals of the benzene and naphthalene series, in which X and Y are selected from the group consisting of hydrogen, acyl, alkyl and aryl radicals. Throughout the specification and claims the term "acyl" will be used in its more limited sense to define the radical of a carboxylic acid. The term will have no other meaning.

The pyrazolones readily form alkali soluble enols which couple smoothly and completely with diazotized aromatic primary amines containing a lake-forming group ortho to the diazo group. Since the resulting dyestuffs contain lake-forming groups ortho to the azo group on both components, they are capable of forming stable metal complexes with the common metallizing metals.

Some typical pyrazolones of the above type which are useful in preparing the products of the present invention are those in which X and Y are both hydrogen and R is as defined, for example, 1-phenyl-3-amino-5-pyrazoline, 1-(alpha-naphthyl)-3-amino-5-pyrazolone, 1-(4'-methoxyphenyl)-3-amino-5-pyrazolone, 1-(3'-methylphenyl)-3-amino-5-pyrazolone, 1-(4'-chlorophenyl)-3-amino-5-pyrazolone, 1-(4'-sulfophenyl)-3-amino-5-pyrazolone, 1-(3'-nitrophenyl)-3-amino-5-pyrazolone, 3-amino-5-pyrazolone; those in which X is hydrogen, Y is an acyl radical, and R is as defined, for example, 1-phenyl-3-acetylamino-5-pyrazolone, 1-phenyl-3-benzoylamino-5-pyrazolone; those in which X is H, Y is an aryl radical, and R is as defined, for example, 1-phenyl-3-(N-phenylamino)-5-pyrazolone.

The preferred products of the present invention are the metallized azo dyestuffs derived from the pyrazolones in which R is an aromatic radical of the benzene series, these being readily obtained through condensation of monosubstituted hydrazines with esters of cyanoacetic acid in the presence of alkaline condensing agents (see Weissberger and Porter; J. Am. Chem. Soc., 64, 2133 (1942).

The products of the present invention are prepared in general by reacting the pyrazolones as described above with diazotized aromatic amines containing in the ortho-position to the diazo group a lake forming group in the presence of an acid binder and subsequently treating the obtained dyestuff with salts of metals capable of producing the metal complexes. It is also convenient to prepare the dyestuffs containing acylamino groups in the 3-position of the pyrazolone nucleus by reacting first the aminopyrazolone with an excess of acylating agent and to use the resulting pyrazole derivative as the coupling component, since the acyl group attached to the oxygen atom is split off by the action of alkaline agents at ordinary temperatures.

The diazo components useful in preparing the products of the present invention are those that have in the ortho-position to the diazo group a group that can be converted into a metal complex, such as, particularly, the hydroxyl group, the carboxylic acid group, and also the alkoxy group and halogen which, under specific conditions in the process of metallization, may be replaced by the complex-forming hydroxyl. Some typical examples of useful diazo components are 2-amino-4-nitrophenol, 2-amino-5-nitrophenol, 2-amino-4-chlorophenol, 2-amino-4-hydroxybenzenesulfonic acid, 2-methyl-4-amino-5-hyroxybenzenesulfonic acid, 2-nitro-4-amino-5-hydroxybenzenesulfonic acid, 2-chloro-4-amino-5-hydroxybenzenesulfonic acid, 2-hydroxy-3-amino-5-chlorbenzenesulfonic acid, 3-amino-4-hydroxy-5-nitrobenzenesulfonic acid, 2-hydroxy-3-amino-5-nitrobenzenesulfonic acid, 2-hydroxy-3-amino-5-sulfobenzoic acid, 2-amino-5-sulfobenzoic acid, anthranilic acid, 1-amino-2-hydroxynaphthalene-4-sulfonic acid, 1-amino-2-hydroxy-6-nitronaphthalene-4-sulfonic acid, 3,3'-dichlorobenzidine, o-dianisidine, 1-(4'-sulfophenyl)-3-methyl-4-amino-5-pyrazolone, and the like.

The diazo component may be also further substituted by azo groups and the aminopyrazolones may be used also as end components in polyazo dyes.

Any of the metals ordinarily used in producing metal complexes may be employed to produce the products of the present invention, such as, for example, chromium, manganese, iron, cobalt, nickel, and copper. For the dyeing of wool, the chromium complexes are of greater value, while for dyeing of cotton the copper complexes are preferable.

Introduction of the metal into the azo dyestuffs may be effected in the customary manner, for example, by refluxing an aqueous solution of the dye with salts or other suitable compounds of the metals, or by heating under pressure. Particular examples of such agents are chromic hydroxide, chromic acetate, chromic formate, chromic fluoride, chromic chloride, basic chromic chloride, chromic sulfate, basic chromic sulfate, chromic benzenesulfonate, chromic naphthalenedisulfonate, and chromic chromate and useful salts of the other metals mentioned above. The metallizing agents may be used in the presence or absence of agents designed to control the pH such as acids, bases, and buffers. They may be used also in the presence of ammonia or amines. If desired, mixed complexes may be obtained by using plurality of metals in the metallization. Valuable mixtures result.

The invention is illustrated by the following examples, the parts being by weight.

*Example 1*

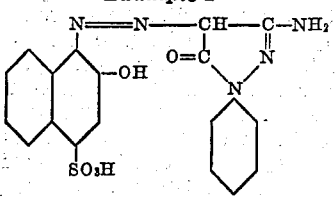

A solution of 1.8 parts of 1-phenyl-3-aminopyrazolone-5 in 20 parts of water and 3 parts of 20% sodium hydroxide is cooled to about 10° C. and to it is added slowly a solution of 2.8 parts of the diazo compound of 1-amino-2-hydroxy-4-naphthalene sulfonic acid (purity 89.2%) in 20 parts of water and 2 parts of 20% sodium hydroxide. The reaction mixture is stirred until coupling is complete and is then diluted with about an equal quantity of water. The azo dye is obtained as a bright red solid by acidification with mineral acid and filtration.

A mixture of 4.1 parts of the azo dye, 40 parts of water, and 10 parts of a basic chromic acetate solution containing 1.1 moles of chromium per liter of solution is heated under reflux with stirring. After refluxing for one hour there are added 20 parts of water and 20 parts of 5% sulfuric acid, and refluxing is then continued for about 20 hours. The chromium complex of the azo dyestuff is recovered by cooling and filtering.

*Example 2*

A dye bath is prepared from 300 parts of water and 2 parts of 20% sulfuric acid, and 0.25 part of the complex chromic compound obtained as described in Example 1 is dissolved therein. 5 parts of a wool skein are well boiled out in ½% soap solution, rinsed in fresh water, and entered into the dye bath. The temperature is raised to and maintained at the boil for 1–1½ hours to full color development. The skein is then rinsed and dried. The skein is levelly dyed a blue tone Bordeaux of excellent fastness to light and washing.

*Example 3*

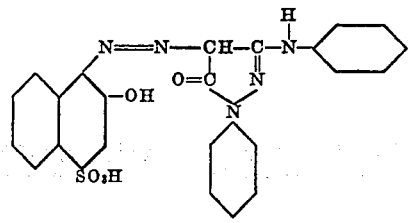

To a cooled solution of 1.8 parts of 1-phenyl-3-anilinopyrazolone-5 in 30 parts of water and 2 parts of 20% sodium hydroxide is added a solution of 2 parts of the diazo compound from 1-amino-2-hydroxy-4-naphthalenesulfonic acid (purity 89%) in 10 parts of water and 2 parts of 20% sodium hydroxide. A deep red solution is obtained and after stirring for a short time the coupling reaction is complete. Acidifying the reaction mixture with mineral acid produces a dark red, gelatinous product which is coagulated by diluting and heating. The dark red solid so obtained is then removed by filtration and dried at 60° C.

4.1 parts of the azo dye are dissolved in 25 parts of water and there are added 7 parts of a basic chromic acetate solution containing 1.1 parts of chromium per liter of solution. The resulting mixture is heated under reflux with stirring for one hour, 15 parts of water and 15 parts of 5% sulfuric acid are added, and refluxing is continued for 24 hours. During this time, the complex chromium derivative separates as a dark solid and is finally isolated by cooling and filtering.

This new product dyes wool by the procedure of Example 2 a deep blue tone Bordeaux of excellent fastness to light and washing.

*Example 4*

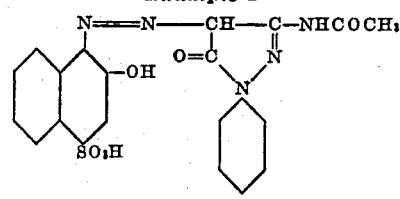

To a cooled solution prepared from 2.6 parts of 1-phenyl-3-acetyl-amino-5-acetoxypyrazole, 20 parts of water, and 4 parts of 20% sodium hydroxide is added a solution of 2.8 parts of the diazo compound from 1-amino-2-hydroxy-4-naphthalenesulfonic acid (purity 89.2%) in 20 parts of water and 2 parts of 20% sodium hydroxide. The coupling reaction is complete after stirring for a short time at room temperature and the dyestuff is isolated as the sodium salt by the addition of sodium chloride. The product is removed by filtration.

The undried dyestuff is combined with 30 parts of water and 10 parts of a basic chromic acetate solution containing 1.1 parts of chromium per liter and the mixture is heated under reflux for 1 hour. To the resulting solution are added 20 parts of water and 20 parts of 5% sulfuric acid and refluxing is continued for 20 hours. The desired chromium complex separates as a red crystalline precipitate which is removed by cooling and filtering.

This new chromium complex dyes wool by the procedure of Example 2 a deep blue tone Bordeaux shade of excellent fastness properties.

Example 5

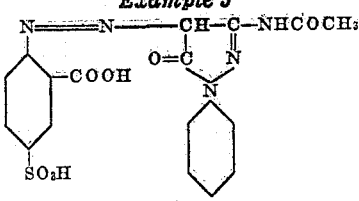

The diazo compound from 2-amino-5-sulfobenzoic acid is prepared in the usual manner from 2.8 parts of 2-amino-5-sulfobenzoic acid (purity 78.3%), 15 parts of water, 7 parts of 17% hydrochloric acid, and 9.9 parts of 7% sodium nitrite solution. The resulting solution of the diazo compound from 2-amino-5-sulfobenzoic acid is then added slowly with stirring to a cooled solution prepared from 2.6 parts of 1-phenyl-3-acetylamino-5-acetoxypyrazole, 10 parts of water, 4 parts of 20% sodium hydroxide, and 20 parts of 10% soda ash solution. After the addition of the diazo compound is complete the reaction mixture is diluted somewhat, neutralized with hydrochloric acid, and treated with salt to precipitate the yellow azo dye.

A solution of 4.4 parts of azo dye in 30 parts of water containing 10 parts of a basic chromic acetate solution with 1.1 moles of chromium per liter are refluxed for about an hour until a yellow-brown solution is produced. 20 parts of water and 20 parts of 5% sulfuric acid are added and refluxing and stirring are continued until the chromium complex of the azo dye separates out as a yellow-brown crystalline solid which is isolated by filtration.

The product so obtained dyes wool by the procedure of Example 2 a bright yellow shade of excellent fastness to light and washing.

Example 6

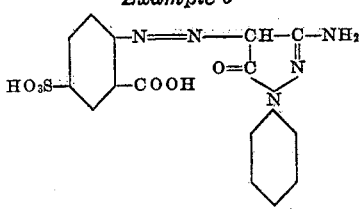

A solution of 5.9 parts of 2-amino-5-sulfobenzoic acid in 25 parts of water and 12 parts of 17% hydrochloric acid is diazotized in the usual manner with 20.2 parts of 7% sodium nitrite solution. The resulting solution is then added slowly to a cooled solution of 3.6 parts of 1-phenyl-3-amino-pyrazolone in 20 parts of water, 8 parts of 20% sodium hydroxide, and 40 parts of 10% soda ash solution. The product separates as a thick, gelatinous, reddish-brown solid by acidification with mineral acid, but heating of this slurry to 90° C. results in coagulation to give the desired product in such a form that it is readily removed by filtration.

9.1 parts of the azo dye are heated under reflux with stirring for one hour with 60 parts of water in 20 parts of a basic chromic acetate solution containing 1.1 atoms of chromium per liter of solution. To the reddish-brown solution which is obtained are then added 40 parts of water and 40 parts of 5% sulfuric acid. Refluxing and stirring are continued for 20 hours and during this time the desired chromium complex separates. It is removed by filtration at about 60° C., washed well with water, and dried at 60° C.

The complex chromium derivative so obtained dyes wool by the procedure of Example 2 a strong yellow shade of excellent fastness properties.

Example 7

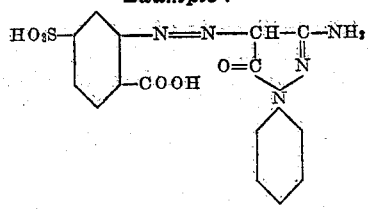

A solution of 2.8 parts of 2-amino-4-sulfobenzoic acid in 15 parts of water and 7 parts of 17% hydrochloric acid is diazotized in the usual manner with 11.5 parts of 7% sodium nitrite solution. The resulting solution is then added slowly with stirring to a cooled solution of 1.8 parts of 1-phenyl-3-aminopyrazolone in 10 parts of water, 4 parts of 20% sodium hydroxide, and 20 parts of 10% soda ash solution. After stirring for a short time, the reaction mixture is diluted and the desired product isolated as a reddish-tan solid by acidification with mineral acid and filtration.

The azo dye is heated under reflux for 1 hour with 30 parts of water and 10 parts of a solution of basic chromic acetate containing 1.1 atoms of chromium per liter of solution. To the yellow-brown solution which results are added 20 parts of water and 20 parts of 5% sulfuric acid and refluxing is continued for a number of hours. The desired chromium complex is then isolated by cooling and filtering.

When this chromium complex is applied on wool by the procedure outlined in Example 2, a deep yellow shade of excellent fastness to light and washing is obtained.

Example 8

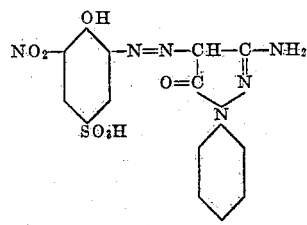

The diazo compound from 3-amino-4-hydroxy-5-nitro-benzenesulfonic acid is prepared in the usual manner from 1.8 parts of the amine. The resulting solution is then added slowly with stirring to a suspension of 1.2 parts of 1-phenyl-3-aminopyrazolone in 15 parts of 10% soda ash solution. As the reaction takes place, a clear solution results and it is necessary to add additional soda ash from time to time to maintain a weak alkalinity. After the coupling reaction is complete, the product is isolated as a red solid by acidification with mineral acid and filtration. An additional amount of the dyestuff may be obtained by heating the filtrate to 60° C., adding common salt, and cooling.

14 parts of the azo dye are heated under reflux for one hour with 50 parts of water and 20 parts of a basic chromic acetate solution containing 1.1 atoms of chromium per liter of solution. To the red solution which is obtained are added 50 parts of water and 30 parts of 5% sulfuric acid and refluxing is continued for 18 hours. The desired chromium complex is then isolated by filtration.

This new chromium complex dyes wool by the procedure described in Example 2 an attractive yellow-brown tint of excellent fastness properties.

Example 9

A solution of 3 parts of the azo dyestuff obtained in Example 1 and 1.7 parts of copper acetate monohydrate dissolved together in 150 parts of water is made acid with hydrochloric acid to Congo red test paper. To this solution there is added 50 parts of a 20% sodium acetate solution and the mixture is then heated at reflux temperature for several hours. When metallization is complete, the desired copper complex is recovered by adding salt to the cooled solution and filtering off the precipitated product.

The dyestuff so obtained produces an attractive bluish-red shade of good fastness on wool.

In a similar manner, the cobalt and nickel complexes of the azo dyestuff obtained in Example 1 are prepared by substituting cobalt or nickel salts for the copper acetate. These metal complexes produce on wool reddish orange and orange shades, respectively.

We do not claim the unmetallized azo dyestuffs in this application as they form the subject matter of our copending application, Serial No. 567,306, filed December 8, 1944, now Patent 2,435,306.

In the claims the term "an amino group" is used generically to cover the group $NH_2$ and substituted amino groups, such as alkyl, aryl and acylamino groups.

We claim:

1. Dyestuffs being complexes of metals of atomic weight from 52 to 64 with azo dyes represented by the formula:

$$A-N=N-CH-C-NHY$$
$$\phantom{A-N=N-C}|\phantom{H-}\|$$
$$\phantom{A-N=N-}O=C\phantom{-}N$$
$$\phantom{A-N=N-CH-}\diagdown\phantom{C}\diagup$$
$$\phantom{A-N=N-CH-C-}N$$
$$\phantom{A-N=N-CH-C-}R$$

in which A is the residue of a diazotized amine selected from the group consisting of amines of the benzene and naphthalene series having in the ortho position to the amine substituent a metallizable substituent selected from the group consisting of hydroxyl, alkoxyl, and carboxylic acid groups, R is an aryl group containing not more than two fused rings, and Y is selected from the group consisting of hydrogen, acyl, and aryl radicals of the benzene series.

2. Dyestuffs being complexes of metals of atomic weight from 52 to 64 with azo dyes represented by the formula:

$$A-N=N-CH-C-NHY$$
$$O=C\phantom{-}N$$
$$\diagdown\phantom{C}\diagup$$
$$N$$
$$Ph$$

in which A is the residue of a diazotized amine selected from the group consisting of amines of the benzene and naphthalene series having in the ortho position to the amine substituent a metallizable substituent selected from the group consisting of hydroxyl, alkoxyl, and carboxylic acid groups, Ph is a phenyl group, and Y is selected from the group consisting of hydrogen, acyl, and aryl radicals of the benzene series.

3. Dyestuffs being complexes of metals of atomic weight from 52 to 64 with azo dyes represented by the formula:

$$Ph-N=N-CH-C-NHY$$
$$O=C\phantom{-}N$$
$$\diagdown\phantom{C}\diagup$$
$$N$$
$$R$$

in which Ph is a phenyl group having in the ortho position a metallizable constituent selected from the group consisting of hydroxyl, alkoxyl and carboxylic acid, R is an aryl group containing not more than two fused rings, and Y is selected from the group consisting of hydrogen, acyl, and aryl radicals of the benzene series.

4. Dyestuffs being complexes of metals of atomic weight from 52 to 64 with azo dyes represented by the formula:

$$Ph-N=N-CH-C-NHY$$
$$O=C\phantom{-}N$$
$$\diagdown\phantom{C}\diagup$$
$$N$$
$$Ph$$

in which Ph is a phenyl group having in the ortho position a metallizable constituent selected from the group consisting of hydroxyl, alkoxyl and carboxylic acid and Y is selected from the group consisting of hydrogen, acyl, and aryl radicals of the benzene series.

5. Dyestuffs according to claim 1 in which Y is hydrogen.

6. Dyestuffs according to claim 2 in which Y is hydrogen.

7. Dyestuffs according to claim 3 in which Y is hydrogen.

8. Dyestuffs according to claim 4 in which Y is hydrogen.

9. Dyestuffs according to claim 1 in which the metal is chromium.

10. Dyestuffs according to claim 2 in which the metal is chromium.

11. Dyestuffs according to claim 3 in which the metal is chromium.

12. Dyestuffs according to claim 4 in which the metal is chromium.

13. Chromium complexes of the azo dyestuff:

$$HO_3S-\bigcirc-N=N-CH-C-NH_2$$
$$\phantom{HO_3S-}\bigg|\phantom{-N=N-}O=C\phantom{-}N$$
$$\phantom{HO_3S-}COOH\phantom{-N=N-CH-}\diagdown\phantom{C}\diagup$$
$$\phantom{HO_3S-\bigcirc-N=N-CH-C-}N$$
$$\phantom{HO_3S-\bigcirc-N=N-CH-C-}C_6H_5$$

14. Chromium complexes of the azo dyestuff:

$$HO_3S-\bigcirc-N=N-CH-C-NH_2$$
$$\phantom{HO_3S-}\bigg|\phantom{-N=N-}O=C\phantom{-}N$$
$$\phantom{HO_3S-}COOH\phantom{-N=N-CH-}\diagdown\phantom{C}\diagup$$
$$\phantom{HO_3S-\bigcirc-N=N-CH-C-}N$$
$$\phantom{HO_3S-\bigcirc-N=N-CH-C-}C_6H_5$$

15. Chromium complexes of the azo dyestuff:

$$N=N-CH-C-NHC_6H_5$$
$$\phantom{N=N-}OH\phantom{-CH-}O=C\phantom{-}N$$
$$\phantom{N=N-CH-C-}\diagdown\phantom{C}\diagup$$
$$\phantom{N=N-CH-C-}N$$
$$\phantom{N=N-CH-C-}C_6H_5$$
$$SO_3H$$

ROBERT SIDNEY LONG.
CHARLES EDWARD LEWIS.

REFERENCES CITED

The following references are of record in the file of this patent:

UNITED STATES PATENTS

| Number | Name | Date |
|---|---|---|
| 2,060,563 | Fischer | Nov. 10, 1936 |
| 2,133,864 | Kopp | Oct. 18, 1938 |
| 2,311,082 | Porter et al. | Feb. 16, 1943 |
| 2,343,703 | Porter et al. | Mar. 7, 1944 |
| 2,367,523 | Porter et al. | June 16, 1945 |

OTHER REFERENCES

Chem. Abst., vol. 16, page 2863, citing Norrall, J. Am. Chem. Soc., vol. 44, pages 1551-7 (1922).